Figure 1:
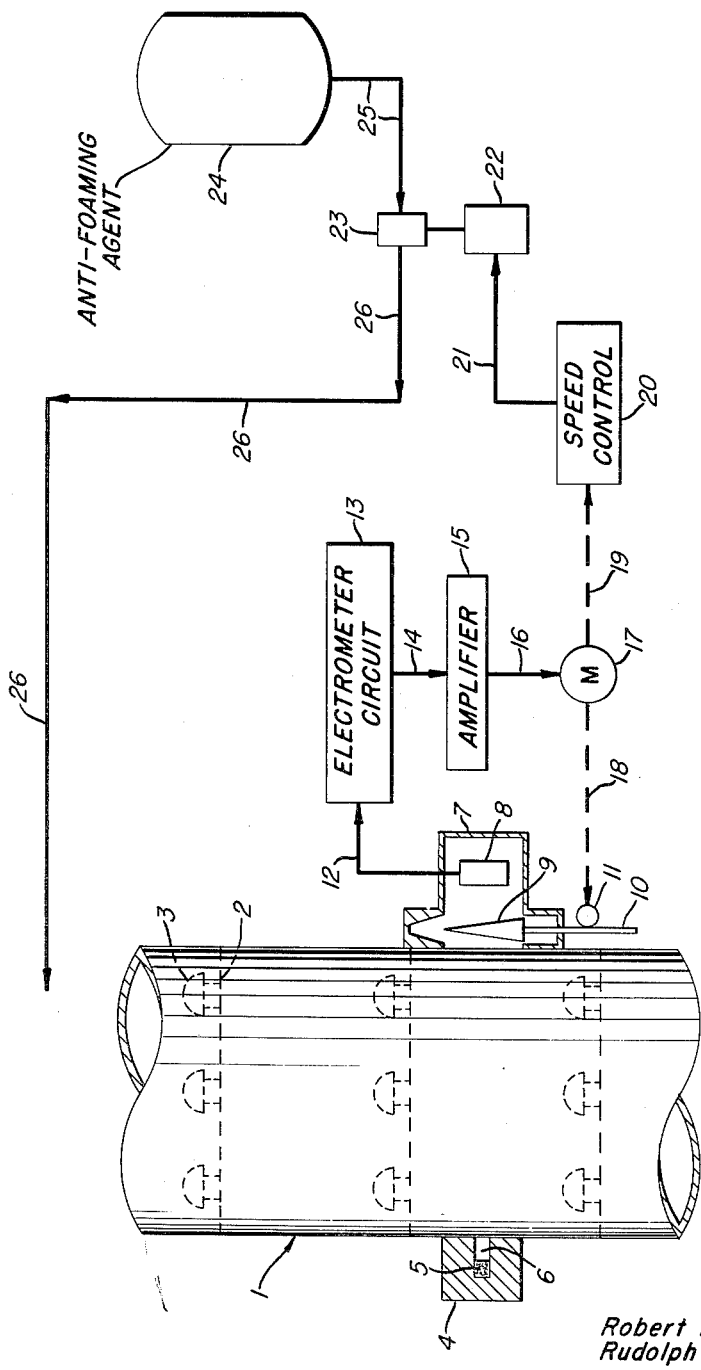

March 27, 1962 — R. L. STOFFER ET AL — 3,027,307
REDUCTION OF DISTILLATION TOWER FOAMING
Filed Aug. 17, 1959 — 2 Sheets-Sheet 1

INVENTORS:
Robert F. Stoffer
Rudolph F. VanWinkle

BY Gerald Rose
ATTORNEY

United States Patent Office 3,027,307
Patented Mar. 27, 1962

3,027,307
REDUCTION OF DISTILLATION
TOWER FOAMING
Robert L. Stoffer, Highland, and Rudolph F. Van Winkle, Hammond, Ind., assignors to Standard Oil Company, Chicago, Ill., a corporation of Indiana
Filed Aug. 17, 1959, Ser. No. 834,323
1 Claim. (Cl. 202—160)

This invention relates to the control or prevention of foaming in distillation towers. More particularly, it concerns method and means for monitoring the operation of a distillation tower so as to reduce the tendency of liquids which are undergoing distillation therein to cause foaming.

One of the major limitations on the throughput capacity of distillation towers is the tendency of liquids undergoing distillation to foam or froth at high vapor rates. This condition of foaming is evidently associated with the surface tension characteristics of the particular liquids at distillation conditions, and appears to be extremely sensitive to vapor velocities in the tower. When a liquid commences to foam, adequate separation of vapors from the liquid on a distillation tray becomes impossible, with the result that tower efficiency is materially reduced. Ultimately, the foam becomes sufficiently dense and prevalent that much carryover of liquid occurs. This condition is termed "flooding."

When flooding occurs, either or both of two remedies may be employed. For one, tower vapor velocities may be lowered, which means either that separation of components is reduced or that tower throughput is proportionally cut down. Clearly, reduction of vapor velocities may be accomplished only by negative performance of the distillation tower.

The second remedy is to introduce chemical antifoaming agents into the tower. These agents are substances which have a low surface tension and form inelastic surface films; the resultant foam is unstable and tends to disperse readily. While chemical antifoaming agents are in wide use, the amount in which they are employed in a given tower must be sufficient to accommodate varying throughput rates, changing conditions of heat input, and variable compositions of feed and product streams. Thus an amount of antifoaming agent must of necessity be adequate to accommodate the worst foreseeable foaming conditions, since an arbitrary reduction in antifoaming agent input could nevertheless cause extensive foaming in a particular portion of the tower. For this reason relatively large amounts of antifoaming agent are employed constantly. Yet this often raises new problems as many antifoaming agents are expensive materials and can contaminate the tower bottoms product as well as foul the reboilers.

It is a primary object of the present invention to provide a system for controlling the foaming in a fractionating tower. A further object is to provide a system which reduces foaming while utilizing only the minimum necessary amount of chemical antifoaming agents. Another object is to monitor the foaming in towers wherein such foaming is ordinarily incapable of detection by pressure drop or visual inspection methods. Still another object is to prevent excessive foaming before such foaming can cause flooding of distillation towers. A general object is to increase the separation efficiency and throughput capacity of distillation towers. Other and more particular objects will become apparent as the description of this invention proceeds in detail.

Briefly, in accordance with the invention, we control foam with chemical antifoaming agents by passing gamma radiation through a portion of a distillation tower which is susceptible to foaming, detect the attenuation of such gamma radiation caused by the presence of relatively dense foams, and regulate the introduction of chemical antifoaming agents into the tower in response to the monitored radiation level. As will appear hereinafter, foam has a density intermediate between that of liquids and vapors in a given tower, and consequently the attenuation of gamma rays by such foam is proportional to the amount of foam which is present. Thus the inventive system provides both a means for monitoring the present amount of foam and of introducing suitable chemical antifoaming agents in amounts sufficient to reduce such foaming to a tolerable level while not using an unnecessary excess of these expensive agents.

Figure 2:
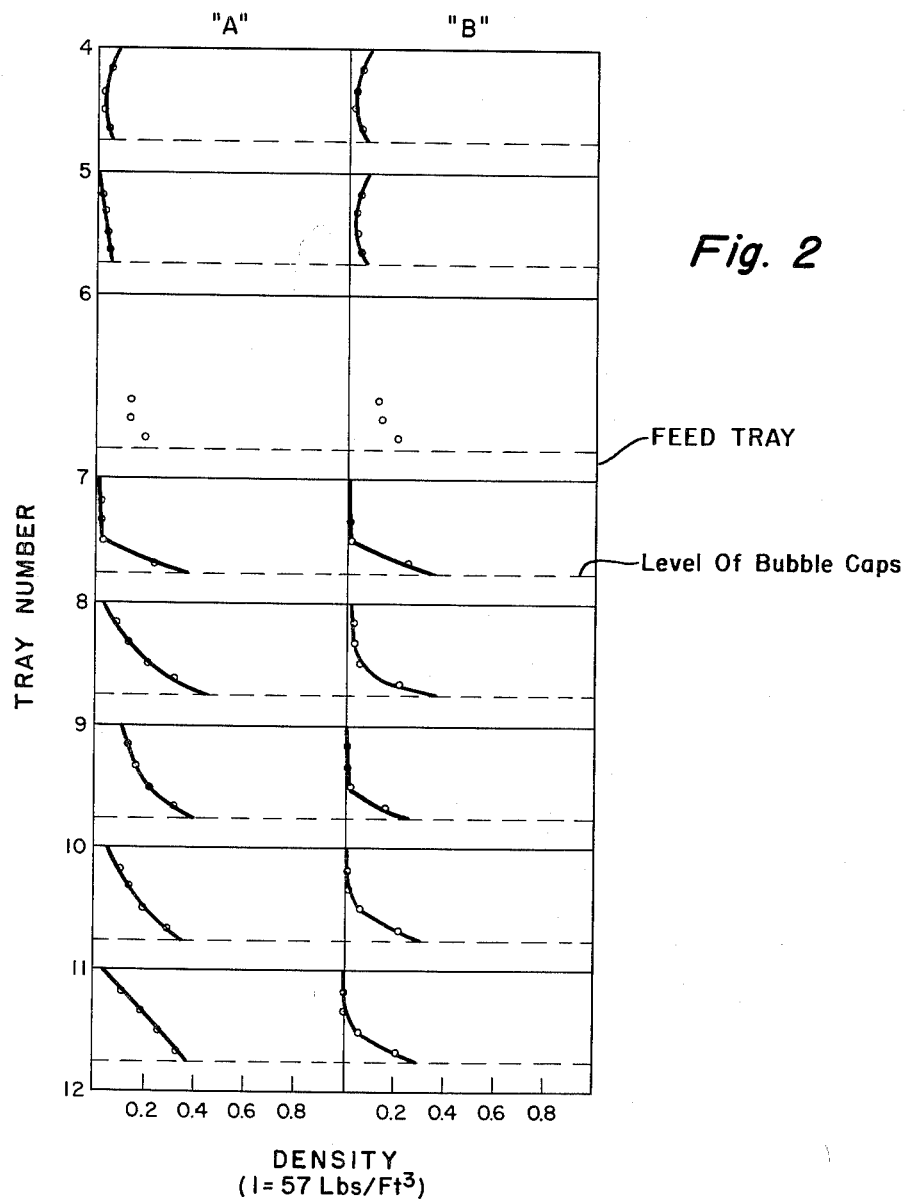

The invention will be described in more detail in the ensuing specification when read in conjunction with the attached drawings wherein:

FIGURE 1 shows in schematic form an embodiment of a tower foaming control system in accordance with the invention; and FIGURE 2 shows the density gradients in a typical distillation tower which are caused by foaming, and which are capable of being disrupted by the use of chemical antifoaming agents.

Turning first to FIGURE 1, the drawing shows a portion of a distillation tower 1 wherein the foam is detected by means of gamma ray source 5 and radiation detector 8, and the introduction of antifoaming agent to tower 1 is controlled by means of an appropriate feedback circuit which serves to regulate the speed of antifoaming agent introduction pump 23.

Tower 1 may be any type of distillation tower, utilizing bubble trays or the like for effecting multistage contacting of liquids with ascending vapors. Such towers are in wide use and normally include auxiliaries such as a reboiler and a reflux system, which are omitted from the drawing for purposes of simplicity and clarity. In the particular tower shown, a plurality of spaced plates 2 and bubble caps 3 are utilized, and these plates 2 are provided with suitable downcomers for transferring liquid from one tray or plate to the tray or plate below it.

Gamma ray source 5 may be any natural or artificial radioisotope which is capable of emitting gamma rays of sufficient energy to pass through tower 1 and be detected by detector 8. Radioactive isotopes are available from government or industrial sources, and include isotopes such as antimony-124 (half life of 60 days, emitting a 2.11 mev. gamma photon), cobalt-60 (5.27 years, 1.33 and 1.17), iron-59 (45.1 days, 1.289) cerium-144-praseodymium-144, (282 days, 0.696), etc. Source 5 is conveniently disposed within housing 4 of iron, lead, or other dense materials so as to afford radiation protection for personnel who may be working in the area. Housing 4 has a slit or hole 6 to direct radiation into and through tower 1.

Located in a sector of about 90–270° from source 5 is a radiation detector 8. Detector 8 is preferably located diametrically opposite source 5 and in a line such that downcomer and tray supports do not interfere with the path of radiation. Detector 8 may be any detector which is sensitive to gamma rays, such as a Geiger-Muller tube or a scintillation counter. For the purpose of reducing background radiation, detector 8 is provided with a housing 7 of dense material.

Detector 8 is connected to a suitable electrometer circuit 13 via symbolic line 12. Electrometer circuits, of which many are known in the art, convert the pulses of radiation received by detector 8 to a voltage or current which is proportional to the rate of such reception. The output of electrometer 13 is transmitted via symbolic line 14 to amplifier 15 of the vacuum tube or transistor type, which provides the drive current for servomotor 17 through symbolic line 16. Servomotor 17 may suitably be any of the types described in the book "Basic Electricity, NAVPERS 10086," prepared by the Bureau of Naval Personnel, especially Chapter 17.

In the embodiment shown in FIGURE 1, wedge 9 is interposed in the path between source 5 and detector 8. Wedge 9 may be made of a material such as lead or iron which attenuates radiation; the amount of radiation which is absorbed is a function of the thickness of radiation attenuating wedge 9 which is interposed between the source 5 and the detector 8. Wedge 9 is carried by rack 10, which is driven by pinion gear 11. This in turn is powered via shaft 18 from servomotor 17. By this arrangement, which in effect is a feedback, radiation attenuating wedge 9 is driven by motor 17 so as to reduce the radiation received by detector 8.

Whenever the radiation path within tower 1 is partially obstructed by foam, the feedback circuit previously described will operate radiation wedge 9 so that detector 8 will receive the original amount of radiation before such foam is present. When movement of wedge 9 occurs, another shaft 19 connected to servomotor 17 either directly or indirectly regulates speed control 20 for antifoaming agent introduction pump 23.

The system for introducing antifoaming agent may consist of a tank 24 which contains the agent, line 25 which leads to pump 23, and line 26 which transmits the antifoaming agent to tower 1. Pump 23 may be a piston pump driven by variable speed motor 22, the speed of which is governed by speed control 20. Accordingly, when foam is detected by detector 8, wedge 9 is partially withdrawn from the radiation path by suitable action of the feedback circuit, and this action is effectively converted to an increased speed of motor 22 by means of coupling of shaft 19 from servomotor 17 to speed control 20.

Other methods for controlling a pump speed or a control valve would be to use a Wheatstone bridge circuit for measuring the signal from the detector 8 through a recorder such as the Leeds & Northrup Micro-Max recorder. This equipment can be used with a conventional controller so that either a motor operated or an air operated valve is controlled by the deviation of the signal from the setpoint on the controller. The controller itself can be a simple proportional controller, or a combination of proportional, derivative, and integral control depending upon the precision of control desired.

A considerable variety of antifoaming agents are known to the art and no specific claim of novelty herein is made to these materials. Primarily, antifoaming agents are liquids or soluble solids which have a low surface tension and form inelastic surface films in the particular liquid which ordinarily tends to foam. For non-aqueous media, the polysiloxanes, which comprise a chain of structural units —Si—O—Si—, with one or two organic groups attached to each silicon atom of the chain. The dimethyl polysiloxanes, or "Silicones," are especially suitable, although the methyl-phenyl polysiloxanes may also be used. A special methyl polysiloxane is available for aqueous solutions. Other antifoaming agents, or foam-supressants, which are useful with hydrocarbon oils include emulsions of glycol or glycerol.

Non-aqueous solutions may have their foaming tendencies suppressed by a number of antifoaming agents, which are not necessarily of equivalent efficacies in all solutions. Branched chain higher alcohols, such as 2-ethylhexanol or 2,6-dimethyl-4-heptanol are frequently useful. The "Ucon" fluids, which are higher polymerized glycols and their ethers; higher fatty acid amides, such as polyamides of the N,N'-distearoylethylene diamide; Dow Corning "Antifoam," and "Anti-Foam 81066" are also suitable.

Additional antifoaming agents which are known to be useful in particular media include: fatty acids and fatty acid esters, such as sorbitan monooleate; pine oil; allyl lactates; higher ethers such as 2-(di-tert-amylphenoxy)-ethanol; organic phosphates; and certain metallic soaps.

The effective concentration of antifoaming agents depends largely on the particular agent, on the particular liquid undergoing distillation, and on the conditions of distillation, e.g. temperature and vapor velocities. The effective concentration thus may range from as little as one part per million (p.p.m.) up to say 1,000 p.p.m. or more. Usually, a concentration of from about 20 to about 500 parts per million is suitable. Accordingly, the inventive system may be adjusted so that it continuously provides 20 p.p.m. of foam suppressant while no foam is detected, and introduces say 500 p.p.m. at high foam rates. At intermediate foam concentrations the rate of antifoaming agent introduction is proportional to the amount of attenuation of radiation.

The location at which antifoaming agent is introduced in distillation tower 1 depends on the expected or determined region of foaming. Most antifoaming agents are relatively nonvolatile and thus tend to descend in tower 1. Accordingly, if foaming is prevalent below the feed tray, the antifoam should be added either with the feed, with the reflux stream, or directly into the tower somewhere above the feed tray. Similarly, if foaming prevails above the feed tray, antifoaming agent should be introduced either with the reflux stream or into the upper portion of the tower.

Turning now to FIGURE 2, a pair of plots are shown which indicate the computed density of foam at various heights of a typical small-size fractionating tower. This particular fractionating tower was employed in a phenol extraction process for removing aromatic compounds from a mixed hydrocarbon feed of the lubricant oil boiling range. The feed to this column was a mixture of phenol, aromatic compounds, and water. The tower effected dehydration by sending a water-enriched fraction overhead while the bottoms, chiefly comprising phenol and extract, were taken as product. In this application, were an excessive amount of antifoaming agent employed, it would necessarily result in contamination of the phenol-aromatic extract.

Foam density measurements were made at several locations in the tower by determining the attenuation of gamma rays from cobalt 60, using a crystal scintillation detector as detector 8 and employing a conventional electrometer circuit 13. From the attenuation, the density was calculated by conventional means; in any given radiation absorber, the amount of absorption is proportional to the density of the absorber.

It will be observed, in the portion of FIGURE 2 marked "A," that foaming prevailed below the feed tray (tray No. 7). On trays 7 through 12, the foam entirely filled the vapor disengaging space between trays.

Antifoamant, in the amount of 50 p.p.m. of Dow Corning "200 Fluid" based on total tower feed, was introduced into the feed stream. After the tower lined out, a set of density measurements was made in the manner employed for graph "A" of FIGURE 2. The results are shown as graph "B."

It will be noted from graph "B" that foaming was reduced on tray 8, and on all other trays below this tray.

It was found that the introduction of antifoaming agent permitted a 20% increase in the capacity of this distillation tower.

From the foregoing description, it is seen that the objects of the invention have been fully satisfied. By monitoring the foam in a distillation tower and introducing an antifoaming agent into the tower in automatic response to such monitored foam, foaming may be materially reduced and tower capacity and efficiency are substantially benefited without employing excessive antifoam agent.

While the invention has been described with reference to particular embodiments thereof, it will be apparent that many modifications and variations will become apparent in view of our description. Accordingly, it is intended to embrace all such modifications and variations

We claim:

In a distillation tower apparatus normally susceptible to foaming therein of liquids undergoing distillation, the improvement whereby said foaming is reduced which comprises: a gamma ray source disposed on one side of said distillation tower; a radiation detector arranged to receive radiation originating from said source and passing through a portion of said distillation tower which is susceptible to foaming; means for introducing chemical antifoaming agent into said distillation tower at a variable rate; and control means responsive to said radiation detector for regulating the antifoaming agent introduction means in response to the attenuation of radiation received by said radiation detector and caused by the presence of foam between the gamma ray source and the radiation detector, said control means including a radiation attenuating wedge interposed between said gamma ray source and said radiation detector, a feedback circuit adapted to position said wedge to maintain a constant level of radiation received by said radiation detector, and means responsive to the position of said wedge for regulating the antifoaming agent introduction means.

References Cited in the file of this patent

UNITED STATES PATENTS

| | | |
|---|---|---|
| 2,323,128 | Hare | Jan. 29, 1943 |
| 2,501,174 | Herzog | Mar. 21, 1950 |
| 2,905,597 | Stafford et al. | Sept. 22, 1959 |